Oct. 14, 1969 R. F. SANFORD 3,472,962

SYNCHRONIZATION SYSTEM FOR TELEVISION SIGNALS WITH AUXILIARY INFORMATION TRANSMITTED DURING THE VERTICAL BLANKING INTERVAL

Filed Sept. 27, 1966 2 Sheets-Sheet 1

INVENTOR.
ROBERT F. SANFORD
BY Eugene M. Whitacre
Attorney

INVENTOR
ROBERT F. SANFORD
BY
Eugene M. Whitacre
Attorney

United States Patent Office 3,472,962

Patented Oct. 14, 1969

3,472,962
SYNCHRONIZATION SYSTEM FOR TELEVISION SIGNALS WITH AUXILIARY INFORMATION TRANSMITTED DURING THE VERTICAL BLANKING INTERVAL

Robert F. Sanford, Princeton Junction, N.J., assignor to RCA Corporation, a corporation of Delaware Filed Sept. 27, 1966, Ser. No. 582,407
Int. Cl. H04l 7/04
U.S. Cl. 178—69.5 5 Claims

ABSTRACT OF THE DISCLOSURE

A horizontal sync pulse generator is described for use in a television system in which auxiliary information is transmitted during the vertical blanking interval. The auxiliary information is separated from the video signal, displayed on a separate cathode ray tube, and recorded to form a permanent record. In order to provide a more perfect registry of the sequentially interlaced fields, the horizontal deflection circuitry for the cathode ray tube is supplied with locally generated horizontal sync pulses derived from the incoming composite sync signal. The locally generated sync signal contains only horizontal sync pulses and thereby eliminates the deleterious effects which would otherwise result if the composite signal containing the vertical sync information were used to control scanning.

This invention relates to the transmission of special message information to the public using existing television facilities without interfering with regular television program service.

A system which accomplishes such transmission is disclosed in pending application, Ser. No. 551,084, filed May 18, 1966, and entitled "Television Message System." One embodiment of the system therein described sequentially multiplexes message representative line scan video signals developed by an auxiliary pick-up camera with primary program video signals developed by a studio pick-up camera during predetermined portions of the vertical blanking interval thereof at a rate of one line scan signal per message per field of program information. More particularly, these video message signals are inserted during a time interval corresponding to that between successive horizontal synchronizing pulses within the vertical blanking interval of each program field. The composite signal is then transmitted to the home receiver in the usual manner, where apparatus is additionally included to separate out the message signals at that same line per field rate. The separated message signals are displayed as they are received, i.e. during the vertical blanking interval of each field, via a thin window type cathode ray tube and recorded by an associated Electrofax printer, while the primary program signals are displayed on the kinescope of the home receiver in the conventional way. As is described in that 551,084 application, the thin window tube displays one horizontal line of message information, which is printed on the advancing paper of an Electrofax printer. Since the kinescope of the home receiver is cut off during the vertical blanking interval, the message information included therein is not displayed and thus does not interfere with the regular program picture as seen by the viewer.

It is an object of this invention to provide improved synchronizing control apparatus for television receivers.

It is another object of the present invention to provide improved horizontal synchronizing control apparatus for the thin window cathode ray tube of such a television message system and, more particularly, apparatus which is unaffected by the equalizing pulses and serrations of the vertical synchronizing pulses of the primary program synchronizing signal that are out of phase with the horizontal synchronizing pulses thereof.

As will become clear hereinafter, one embodiment of such apparatus includes first and second monostable multivibrators operative to remove those out-of-phase pulses and serrations from the synchronizing information used to control the horizontal scan rate for the electron beam of the thin window tube.

The novel features which are considered to be characteristic of the present invention are set forth with particularity in the appended claims. The invention itself, however, both as to its organization and method of operation, and as to the advantages thereof, will best be understood by reference to the accompanying drawings in which.

Figure 2:
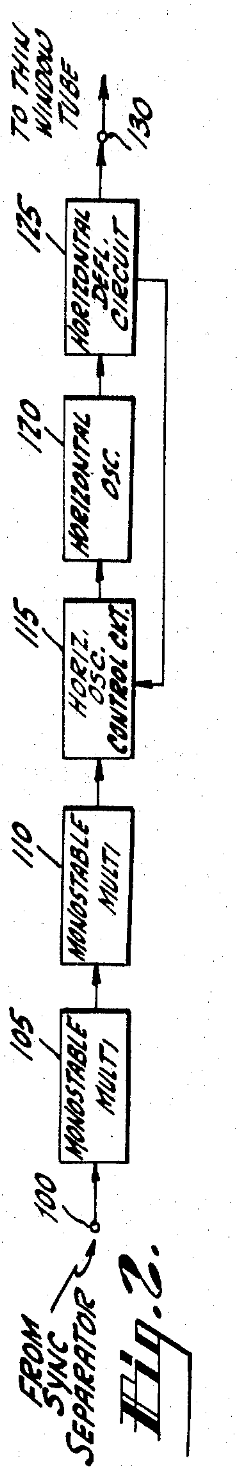
FIGURE 2 is a block diagram of a horizontal deflection system including synchronizing control apparatus embodying the invention.
Figure 3:
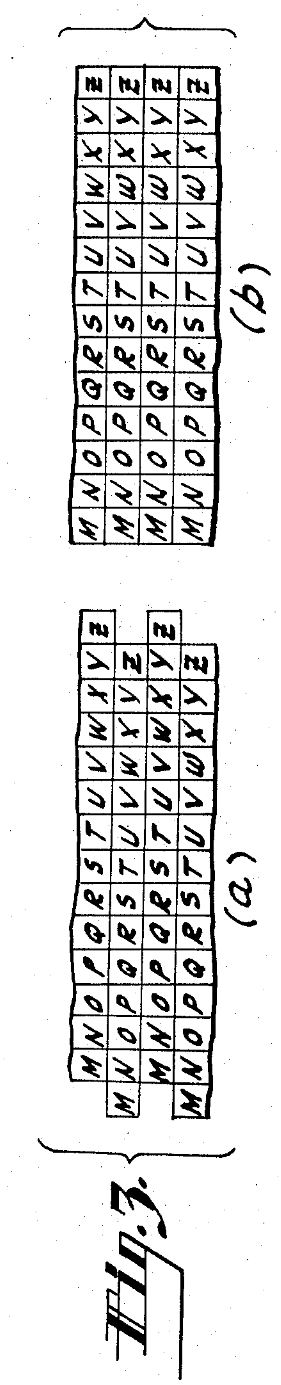
Figure 4:
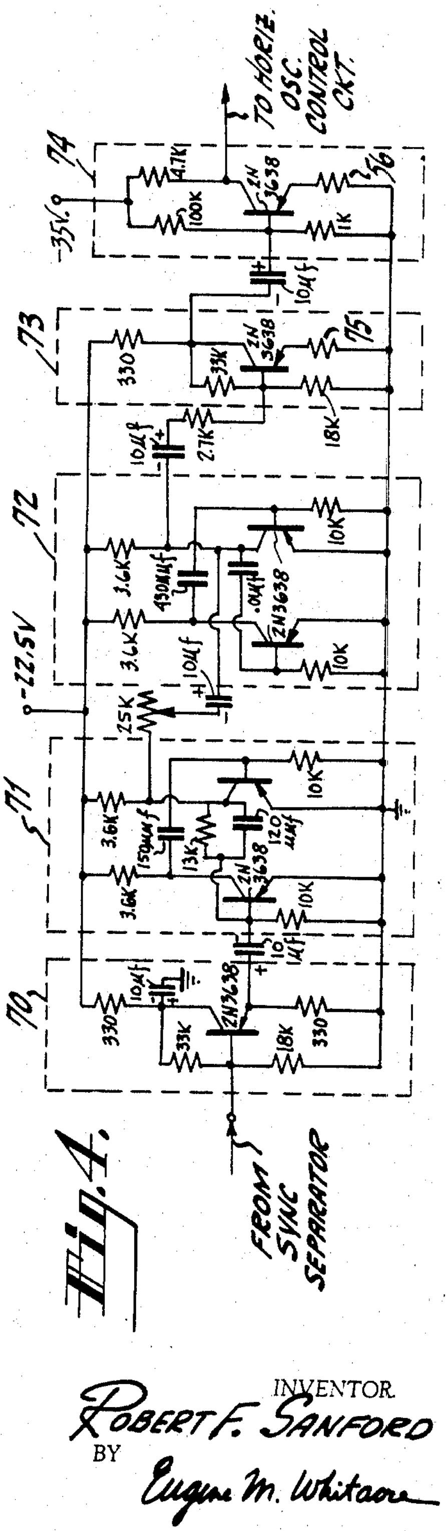

FIGURES 3*a* and 3*b* are diagrammatic illustrations of message information presentations which assist in explaining the operation of the circuits of FIGURES 2 and 4; and FIGURE 4 is a schematic diagram of a portion of the circuit shown in the block diagram of FIGURE 2.

Figure 1:
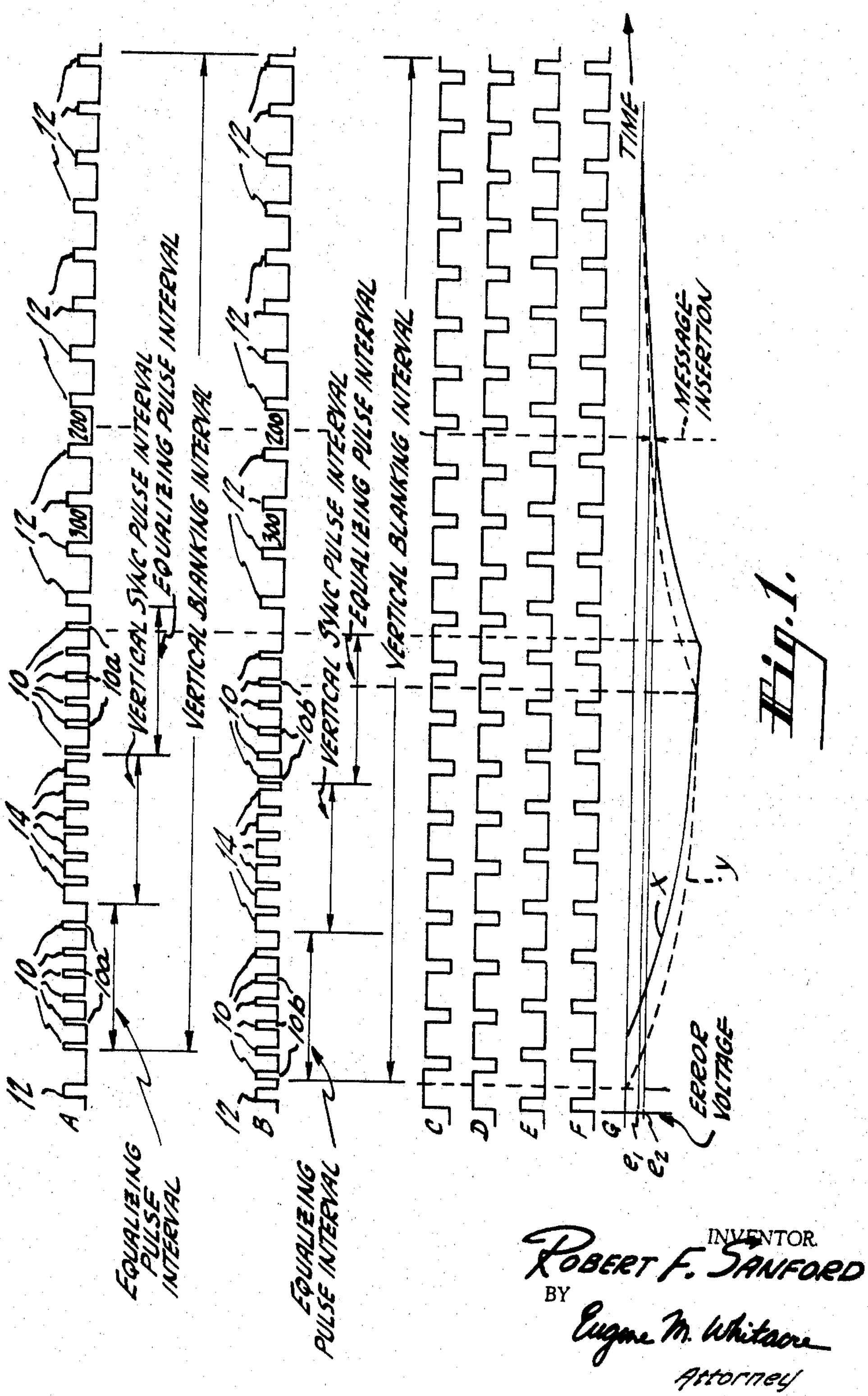
FIGURE 1 is a series of waveforms for alternate television scanning fields whiuh are helpful in an understanding of the present invention.

Referring now to FIGURE 1 in more detail, the waveforms A and B there shown respectively illustrate the vertical blanking interval for the even and odd fields of the interlaced television signal used in the United States. As is well known, each of these intervals include equalizing pulses 10, horizontal synchronizing pulses 12, and serrated vertical synchronizing pulses 14. The equalizing pulses 10 function to maintain vertical synchronization of a television receiver even though two interlaced scanning fields are utilized, while the horizontal synchronizing pulses 12 maintain horizontal synchronization of the receiver during the latter portion of each of the vertical blanking intervals. The serrated vertical synchronizing pulses 14 maintain horizontal synchronization of the receiver during vertical retrace.

The composite synchronizing signal depicted in waveforms A and B is also used to synchronize the horizontal deflection in the thin window cathode ray tube of the above-described television message system receiver. When used in such a message system environment, the composite synchronizing signal additionally includes auxiliary video message signals located, for example, in that space in the vertical blanking interval indicated in waveforms A and B by the numeral "200." Message identifying category code signals might further be included, in the space denoted "300" for example, as described in that 551,084 application.

Referring now to FIGURE 2, there is shown a block diagram of a horizontal deflection system including synchronizing control apparatus embodying the present invention. Composite synchronizing signals of the form illustrated by waveforms A and B in FIGURE 1 are coupled from the synchronizing signal separator of the television message system via input terminal 100 to a first monostable multivibrator unit 105. Multivibrator unit 105 is driven from its stable to its unstable state by the leading edges of the pulses applied thereto. The time constants of the multivibrator circuit are selected so that the multivibrator remains in the unstable state for a period longer than that between successive leading edges of the equalizing pulses, but less than that between successive leading edges of the horizontal synchronizing pulses. The resultant wave trains at the horizontal synchronizing repetition rate for successive fields are illustrated respectively in waveforms C and D of FIGURE 1. It will be observed that the waveforms C and D are identical even though the applied waveforms A and B are not.

The pulses developed by unit 105 are then applied to a second monostable multivibrator unit 110. Multivibrator unit 110 is responsive to the leading edges of the applied pulses to be driven from its stable to its unstable state. The time constants of multivibrator unit 110 are such that the multivibrator will remain in its unstable state for a period equal to the duration of the original synchronizing pulse. As a result, a second series of pulses are produced which have a duration equal to, and which are in phase with the horizontal synchronizing pulses of the composite synchronizing signal. Such a series of pulses for the successive fields is illustrated by waveforms E and F in FIGURE 1.

The pulses developed by unit 110 are applied to a horizontal oscillator synchronizing control circuit 115, including an automatic frequency control phase detector to maintain a horizontal oscillator 120 in synchronism with the received horizontal synchronizing pulses.

The horizontal oscillator 120, responsive to this frequency control, drives a horizontal deflection circuit 125 to produce horizontal deflection signals for the thin window tube of the television message system receiver at output terminal 130. Part of the deflection signal developed by circuit 125 is fed back to the oscillator control circuit 115 in the conventional manner.

In the interlaced scanning arrangement employed in the message system environment, the equalizing pulses and the serrations of the vertical synchronizing pulses occur at twice the horizontal synchronizing frequency, i.e. 31,500 c.p.s. as against 15,750 c.p.s. Of these equalizing pulses and vertical serrations, those which occur at input terminal 100 in phase with the horizontal synchronizing pulses serve to continue horizontal synchronization of the electron beam deflection in the thin window cathode ray tube. By virtue of the present invention, those pulses and serrations which occur at terminal 100 out of phase with the horizontal synchronizing pulses have no effect on the electron beam deflection since they are removed from the synchronizing information applied to the horizontal deflection circuit 125 (waveforms E and F of FIGURE 1). This is to be contrasted with the horizontal synchronizing control apparatus arrangement usually found in television receiver circuits, where the composite synchronizing signal is coupled to the horizontal oscillator control circuit.

If such usual apparatus were to be used in the above-described television message system, the following would be found to exist. First, the control circuit 115 would mistake the out of phase pulses and serrations as indications that the 15,750 c.p.s. horizontal oscillator 120 is off frequency. It would therefore produce an erroneous error voltage to compensate, by altering the phase of the oscillator 120. Since the equalizing pulses start one line after the last horizontal synchronizing pulse in an even field (FIGURE 1, waveform A) and one-half line after that pulse in an odd field (FIGURE 1, waveform B), the build up in error voltage would commence at different times in the two fields. The accumulated error voltage at any instant of time in the vertical blanking interval, including that corresponding to the time of insertion of the auxiliary message signal, would then be different from one field to the next. This difference in error voltage is illustrated in waveform G of FIGURE 1 where the even field build up, represented by the curve X, begins with the first out-of-phase equalizing pulse 10*a* of waveform A, while that for the odd field, represented by the curve Y, begins with the first out-of-phase equalizing pulse 10*b* of waveform B. The error voltage curves X and Y would then continue to build up through the equalizing pulse and vertical synchronizing pulse intervals until they reach a maximum at a point corresponding to the last out-of-phase equalizing pulse 10*a* and 10*b* respectively, at which time they would begin to decay towards zero volts as shown. Due to the different error voltages $e_1$ and $e_2$ for the curves X and Y at the time of message insertion, the phase of the horizontal oscillator 120 during this time interval and hence the horizontal scanning line position for the thin window tube of the message system receiver, would differ from one field to the next. Since the auxiliary message is printed out on the Electrofax unit during this interval, this difference in line position would cause information elements of alternate lines of the recorded message to be displaced with respect to one another. Such displacement is illustrated by the presentation of FIGURE 3*a*, where M, N, O, etc. represent various message information elements. By eliminating the out of phase pulses and serrations according to the principles of the horizontal synchronizing control apparatus of the present invention, however, a uniform horizontal scanning line position is established from field to field. The message presentation is then as illustrated in FIGURE 3*b*.

There is shown in FIGURE 4 a schematic diagram representing a possible construction for the multivibrator units 105 and 110 of FIGURE 2. With reference thereto: impedance matching is provided by the stage 70; the first multivibrator function, i.e. of unit 105, is provided by the stage 71; the second multivibrator function, i.e. of unit 110, is provided by the stage 72; and pulse amplification is provided by the stages 73 and 74.

While the horizontal synchronizing control apparatus of the present invention has been described as it would be used in one embodiment of the television message system of application 551,084, it should be noted that it would perform equally as well as part of the horizontal deflection system of a home television receiver. By removing the out of phase equalizing pulses and vertical serrations from the synchronizing information just prior to their application to the horizontal synchronizing control circuit of the receiver, the warping or tearing of the reproduced picture at the start of each field they might otherwise cause can be eliminated. When used in such an environment, terminal 100 of the horizontal deflection system of FIGURE 2 would be coupled to the output of the synchronizing signal separator of the television receiver while terminal 130 would be coupled to the horizontal deflection yoke of the kinescope.

It should also be noted that multivibrator 105 by itself is capable of eliminating these out of phase pulses and serrations (see FIGURE 1, waveforms C and D). Multivibrator 110 is then included in the system of FIGURE 2 to provide additional delay to the pulses developed by the unit 105 so that the resulting pulses are in proper phase relationship with the signal fed back to the horizontal oscillator control circuit 115 from deflection circuits unit 125 to effect desired automatic frequency control.

It should additionally be noted that the principles of the present invention are equally applicable in that embodiment of the television message system described in the above-mentioned application wherein a cathode ray tube and Polaroid camera are used to display and record the auxiliary message information. By eliminating the out of phase pulses and vertical serrations with control apparatus embodying the invention, a uniform message presentation for alternate television fields would be established from there too.

What is claimed is:

1. For use in conjunction with a television message system of the type wherein message representative line scan video signals developed by an auxiliary video pick-up device and sequentially multiplexed with regular television program video signals developed by a primary video pick-up device during predetermined portions of the vertical blanking interval thereof at a rate of one line scan signal per message per field of program information are displayed at said rate by a cathode ray tube having an electron beam, apparatus comprising:

horizontal synchronizing control circuit means for synchronizing a horizontal deflection system for the electron beam of said tube;

a source of composite synchronizing signals including synchronizing pulses occurring at the repetition rate of and out of phase with horizontal synchronizing pulses at the end of alternate fields of information;

and means for preventing said out of phase pulses from being applied to said horizontal synchronizing control circuit means, said means including:

means responsive to said composite signals for developing a first series of pulses occurring at the horizontal synchronizing repetition rate, with each pulse of said first series having a duration greater than the time of one cycle of a pulse occurring at twice the horizontal synchronizing repetition rate and less than the time of one cycle of said horizontal synchronizing pulses;

means responsive to said first series of pulses for developing a second series of pulses occurring at said horizontal synchronizing rate, with each pulse of said second series having a duration equal to that of and being in phase with said horizontal synchronizing pulses; and means for connecting said second series of pulses to said control circuit means.

2. Apparatus as defined in claim 1 wherein said means responsive to said composite signals includes a monostable multivibrator locked in phase with the leading edge of synchronizing pulses occurring at the repetition rate of and in phase with said horizontal synchronizing pulses and having a transition time greater than the time of one cycle of a pulse occurring at twice the horizontal synchronizing repetition rate and less than the time of one cycle of said horizontal synchronizing pulses.

3. Apparatus as defined in claim 1 wherein said means responsive to said first series of pulses includes a monostable multivibrator locked in phase with the leading edge of each of said first series of pulses and having a transition time equal to the duration of said horizontal synchronizing pulses.

4. Apparatus as defined in claim 1 wherein said horizontal synchronizing control circuit means includes an automatic frequency control circuit phase detector.

5. For use in conjunction with a cathode ray type image reproducing device in an interlaced scanning system, apparatus comprising:

horizontal synchronizing control circuit means for synchronizing a horizontal deflection system for the electron beam of said cathode ray device;

a source of composite synchronizing signals including synchronizing pulses occurring at the repetition rate of and out of phase with horizontal synchronizing pulses at the end of alternate fields of information;

and means for preventing said out of phase pulses from being applied to said horizontal synchronizing control circuit means, said means including:

means responsive to said composite signals for developing a first series of pulses occurring at the horizontal synchronizing repetition rate, with each pulse of said first series having a duration greater than the time of one cycle of a pulse occurring at twice the horizontal synchronizing repetition rate and less than the time of one cycle of said horizontal synchronizing pulses;

means responsive to said first series of pulses for developing a second series of pulses occurring at said horizontal synchronizing rate, with each pulse of said second series having a duration equal to that of and being in phase with said horizontal synchronizing pulses; and means for connecting said second series of pulses to said control circuit means.

References Cited

UNITED STATES PATENTS 2,874,213 2/1959 Beers ............ 178—5.6

ROBERT L. GRIFFIN, Primary Examiner

ROBERT L. RICHARDSON, Assistant Examiner

U.S. Cl. X.R.

178—5.6